(12) United States Patent
Herdel et al.

(10) Patent No.: US 12,409,591 B2
(45) Date of Patent: Sep. 9, 2025

(54) INJECTION MOLD FOR TUBULAR PLASTIC PARTS

(71) Applicant: OTTO MÄNNER GMBH, Bahlingen a.K (DE)

(72) Inventors: Marco Herdel, Ihringen (DE); Patrick Kern, Endingen (DE)

(73) Assignee: OTTO MÄNNER GMBH, Bahlingen A.K. (DE)

( * ) Notice: Subject to any disclaimer, the term of this patent is extended or adjusted under 35 U.S.C. 154(b) by 82 days.

(21) Appl. No.: 17/800,439

(22) PCT Filed: Mar. 8, 2021

(86) PCT No.: PCT/EP2021/055809
§ 371 (c)(1),
(2) Date: Aug. 17, 2022

(87) PCT Pub. No.: WO2021/176104
PCT Pub. Date: Sep. 10, 2021

(65) Prior Publication Data
US 2023/0075712 A1    Mar. 9, 2023

(30) Foreign Application Priority Data
Mar. 6, 2020    (DE) .................. 10 2020 106 191.9

(51) Int. Cl.
*B29C 45/26*    (2006.01)
*B29C 45/36*    (2006.01)
(Continued)

(52) U.S. Cl.
CPC ............ *B29C 45/261* (2013.01); *B29C 45/36* (2013.01); *B29C 45/77* (2013.01); *B29C 45/78* (2013.01);
(Continued)

(58) Field of Classification Search
CPC .... B29C 2045/363; B29C 2945/76006; B29C 2945/7604; B29C 2945/7629;
(Continued)

(56) References Cited

U.S. PATENT DOCUMENTS

| 4,750,877 A | 6/1988 | McFarlane |
| 5,439,370 A | 8/1995 | Lalaouna et al. |

(Continued)

FOREIGN PATENT DOCUMENTS

| CN | 1972792 A | * | 5/2007 | ......... B29C 33/0038 |
| CN | 204263472 U | | 4/2015 | |

(Continued)

OTHER PUBLICATIONS

Machine English translation of JP 2002254474 A (Tanaka et al.) (Year: 2002).*

(Continued)

*Primary Examiner* — Jeffrey M Wollschlager
*Assistant Examiner* — Edgaredmanuel Troche
(74) *Attorney, Agent, or Firm* — CANTOR COLBURN LLP

(57) ABSTRACT

An injection mold for the manufacturing of at least one tubular plastic part, including a first mold half including a first mold plate and a second mold half including a second mold plate arranged displaceable with respect to each other in an axial direction (Z) between an open and a closed position. The injection mold includes at least one core protruding from the first mold plate and the second mold plate including at least one cavity suitable to receive the core to form a molding cavity in the closed position of the injection mold for receiving molten plastic material therein to form the tubular plastic part. A bushing is arranged in the second mold half adjacent to a dorsal end of the cavity at least partially displaceable with respect to the second mold (Continued)

plate, the bushing including a bore in the closed position suitable to receive a tip of the core.

16 Claims, 3 Drawing Sheets

(51) Int. Cl.
    *B29C 45/77*     (2006.01)
    *B29C 45/78*     (2006.01)
    *B29L 23/00*     (2006.01)

(52) U.S. Cl.
    CPC .... *B29C 45/2606* (2013.01); *B29C 2045/363* (2013.01); *B29C 2945/76006* (2013.01); *B29C 2945/7604* (2013.01); *B29C 2945/7629* (2013.01); *B29L 2023/00* (2013.01)

(58) Field of Classification Search
    CPC ....... B29C 45/261; B29C 45/33; B29C 45/36; B29C 45/77; B29C 45/78; B29C 45/2606
    USPC ............................ 264/328.1, 563; 425/590
    See application file for complete search history.

(56) References Cited

U.S. PATENT DOCUMENTS

| | | |
|---|---|---|
| 2003/0173711 A1 | 9/2003 | Dambricourt |
| 2004/0109919 A1* | 6/2004 | Clarke ................. B29C 45/561 425/590 |
| 2008/0079197 A1 | 4/2008 | Hoogland |
| 2016/0070593 A1 | 3/2016 | Harris et al. |
| 2016/0075060 A1 | 3/2016 | Halter |
| 2019/0283298 A1 | 9/2019 | Mühlemann |
| 2019/0299507 A1 | 10/2019 | Vogl et al. |

FOREIGN PATENT DOCUMENTS

| | | | |
|---|---|---|---|
| CN | 206579097 U | 10/2017 | |
| CN | 209937579 U | 1/2020 | |
| DE | 1508890 A1 | 4/1970 | |
| DE | 1 729334 A1 | 6/1972 | |
| DE | 10239109 A1 | 3/2004 | |
| DE | 103 33 160 A1 | 2/2005 | |
| EP | 2228195 A1 | 9/2010 | |
| EP | 2 397 301 A1 | 12/2011 | |
| JP | S54-58761 A | 5/1979 | |
| JP | S61-144314 A | 7/1986 | |
| JP | H07-290519 A | 11/1995 | |
| JP | H091595 A | 1/1997 | |
| JP | 2001145942 A * | 5/2001 | ........... B29C 45/281 |
| JP | 2002254474 A * | 9/2002 | |
| JP | 3859037 B2 * | 12/2006 | ......... B29C 45/2806 |
| JP | 4602575 B2 * | 12/2010 | |
| WO | WO-2013127725 A1 * | 9/2013 | ........ A61M 25/0009 |
| WO | WO 2018/065312 A1 | 4/2018 | |

OTHER PUBLICATIONS

Machine English translation of JP 4602575 B2 (Tanaka et al.) (Year: 2010).*

Machine English translation of JP 2001145942 A (Takeda et al.) (Year: 2001).*

Machine English translation of CN 1972792 A (Tsuneo, Mamada) (Year: 2007).*

Machine English translation JP3859037B2 (Ozeki) (Year: 2006).*

Chinese Office Action and Search Report for Chinese Application No. 202180017996.5; Report Mail Date Apr. 28, 2024 (39 Pages—with English Translation).

EPO (Riswijk, NL), English language version of the International Search Report, Form PCT/ISA/210, for International Application PCT/EP2021/055809, May 31, 2021 (2 pages).

EPO (Riswijk, NL), English language Written Opinion of the Int'l Searching Authority, Form PCT/ISA/237, for Int'l Appln. PCT/EP2021/055809, May 31, 2021 (6 pages).

DPMA, Second Office Action for German Patent Application No. DE102020106191.9, dated May 5, 2023 (7 pages).

* cited by examiner

INJECTION MOLD FOR TUBULAR PLASTIC PARTS

CROSS REFERENCE TO RELATED APPLICATION

This application is a National Phase filing in the United States, under 35 USC § 371, of PCT International Patent Application PCT/EP2021/055809, filed on 8 Mar. 2021 which claims the priority of German Patent Application DE 10 2020 106 191.9, filed 6 Mar. 2020. These applications are hereby incorporated by reference herein in their entirety and is made a part hereof, including but not limited to those portions which specifically appear hereinafter.

BACKGROUND OF THE INVENTION

Field of the Invention

The present disclosure is directed towards the field of injection molds, in particular towards injection molds for injection molding of tubular parts made from plastic and other thermoplastic materials.

Discussion of Related Art

Injection molds for the manufacturing of elongated, tubular plastic parts, such as pipettes or tips in particular, require a high degree of precision in their construction, as well as their operation. These injection molds usually comprise two mold halves, the first mold half having a core and the second mold half having an associated cavity, together forming a molding cavity to receive molten plastic material to form the elongated, tubular plastic part. In order to form tubular plastic parts, the tip of core has to extend beyond the molding cavity and has to be received in the second mold half in a precise manner, such that no molten plastic is injected beyond the mold cavity. Thermal expansion of various components of the injection mold during operation complicate the core tip being received in a precise manner and the core tip is thus often subject to wear.

Attempts are known from the prior art, briefly described hereinafter, which addressed the problem described above.

EP2397301A1 first published in December 2011, in the name of Mold Masters, relates to an injection molding system and to an edge-gated nozzle that delivers moldable material to a cavity from substantially opposing sides. The core of the described injection molding systems first mold half has a narrower portion which is accommodated in its second mold half in order to form tubular parts.

SUMMARY OF THE INVENTION

In a preferred variation, the injection mold for the manufacturing of at least one tubular plastic part comprises a first mold half comprising a first mold plate and a second mold half comprising a second mold plate being arranged displaceable with respect to each other in an axial direction between an open position and a closed position. In the closed position the mold halves are generally in direct contact and in the open position the tubular plastic part can be removed from the injection mold. The Injection mold further comprises at least one core protruding from the first mold plate. The second mold plate comprises at least one cavity suitable to receive the core of the first mold half to form a molding cavity in the closed position of the injection mold for receiving molten plastic material therein to form the tubular plastic part. Usually, the second mold plate comprises several cavities and preferably several associated cores are arranged at the first mold plate. A bushing is arranged in the second mold half adjacent to a dorsal end of the cavity at least partially displaceable with respect to the second mold plate. The bushing comprises a bore suitable to receive a tip of the core in a closed position of the injection mold. Depending on the field of application the core can have a circular cross-section, however other geometries are also possible. In order to form a tubular plastic part, the tip of the core usually projects in the closed position of the injection mold from the dorsal end of the cavity into the bore of the bushing.

For wear reducing performance of the injection mold, the bushing is preferably at least partially arranged in lateral direction in a floating manner. This way the tip of the core can be received by the bore of bushing in a wear minimizing manner, since the bushing is at least partially able to adjust its lateral positioning, such that the bore is coaxial with the tip of the core. The lateral direction being orthogonal to the axial direction. Furthermore, the bushing can be arranged in the axial direction in a displaceable manner. This allows the distance between the bushing and the distal end of the cavity to varied by displacing the bushing in the axial direction. The tip of the core may comprise a cylindrical section, which can be accommodated in the essential cylindrical bore of the bushing in the closed position. This allows to compensate a thermal expansion of the core in the axial direction during operation of the injection mold, since an expansion of the core in the axial direction leads to the tip of the core projecting further into the bore. Alternatively, or in addition, a conical section of the tip of the core is possible as well.

In an advantageous variation, the bushing comprises a conical first surface arranged at the outside of the bushing coaxially with respect to the bore. The first conical surface may interact in the closed position of the injection mold with a conical second surface arranged at the second mold half such that the tip of the core is centered with respect to the bore. Conical in a preferred variation refers to being angled and or tapered with respect to the axial direction and/or the general direction of the bore. The conical second surface may be formed as part of the second mold plate and is arranged in the axial direction between the cavity and the bushing and essentially stationary with respect to the cavity.

For a molten plastic tight sealing between the core and the bore, the bushing can comprise in a circumferential direction several clamping segments arranged displaceable with respect to each other usually in a radial direction with respect to the bore such that the tip of the core in the closed position of the injection mold can be accommodated in the bore in a molten plastic tight sealing manner. In other words, the tip of the core can be received in the bore of the bushing in a force-locking manner, when the clamping segments are displaced inwardly in a radial direction with respect to the bore resulting in a decrease in a diameter of the bore. The diameter of the bore is in the open position of the injection greater or equal to a diameter of the tip of the core.

The clamping segments can be separated by one or more slits in the bushing extending at least partially in the axial direction. Preferably the clamping segments are interconnected to each other by a common base.

In a preferred variation, the bushing comprises a front segment being arranged during operation between the dorsal end of the cavity and the clamping segments. The front segment comprises an undisrupted inlet opening of the bore for receiving the core. This allows to receive the tip of the core in a low-friction manner, while providing an even or smooth contact surface of the bushing with respect to the cavity, to produce high quality parts without burrs. Undisrupted inlet opening in this context can be understood as continuous and circumferential inlet opening, in particular a smooth inlet opening. The front segment can be formed as a separate part. Good results are possible, when the front segment is formed as a washer-type part, such that the tip of the core may pass through the front segment for being partially accommodated by the clamping segments and partially by the front segment. This allows to further minimize friction based wear of the tip of the core during operation. Alternatively, or in addition, the bushing can be formed as a washer-type element.

Preferably, the bushing is in the closed position of the injection mold at least partially displaceable and/or clampable with respect to the second mold plate by an actuator arranged at least partially displaceable with respect to the second mold plate. The bushing is therefore usually arranged in the axial direction between the dorsal end of the cavity and the actuator. The actuator is generally configured to induce a relative force in the axial direction between the conical first surface and the conical second surface. This in turn leads to an alignment of the conical first surface and the conical second surface and a resulting force in the radial direction. The clamping segments are preferably mechanically interconnected to the conical first surface and the resulting force in the radial direction can thus displace the clamping segments.

Good results are possible, when the actuator comprises at least one displaceable hydraulic piston and/or a pneumatic piston. In a preferred variation the second mold plate comprises several cavities arranged in a circular manner. A simple design can be achieved when the piston is ring shaped, so that its shape can follow the circular arrangement of the cavities. Preferably, the ring shaped piston allows a simultaneous displacement cavity in the axial direction of several bushings each associated with a cavity. Alternatively, or in addition, the actuator may comprise a pusher insert arranged in the axial direction between the bushing and the piston of the actuator to mechanically interconnect the piston and the bushing. In a preferred variation, the conical second surface may be formed as part of the actuator, in particular as part of the pusher insert and is in the axial direction displaceable with respect to the cavity. Alternatively, or in addition, the actuator comprises a spring loaded actuation plate. The actuation plate can be ring shaped and can further comprise through bores to at least partially, accommodate the pusher inserts. This allows the actuation plate to hold the pusher insert in the axial direction relative to the piston. It further allows to exert a resetting force on the piston.

Alternatively, or in addition to the piston, the actuator may comprise of a rod-shaped pusher mechanically interconnecting in the closed position of the injection mold the first mold half and the spring loaded actuation plate arranged in the second mold half, such that the actuation plate is displaceable with respect to the second mold plate by the rod-shaped pusher.

To monitor the manufacturing of the tubular plastic parts at least one sensor may be arranged in or adjacent to the bushing. The sensor can be a pressure and/or temperature sensor.

The bushing can be held with respect to the second mold plate or the actuator by a holding means. The holding means comprises at least one out of the following elements a circlip, a ring from an elastic material, a stopper screw or bolt, etc.

Good results can be achieved when the bushing comprises at least one cut-out arranged laterally and connecting the bore and the outside of the bushing. Preferably the cut-out is arranged between two clamping segments and the base, to allow for a displacement of the clamping segments in the radial direction requiring less force.

Another aspect of the disclosure is directed towards a method for manufacturing at least one tubular plastic part with an injection mold as described above. The method usually comprises the following steps:

closing the injection mold by displacing the mold halves relative to each other from the open position into the closed position. The core of the first mold plate is thereby received in the cavity of the second mold plate and the tip of the core projects in the axial direction from the dorsal end of the cavity. The tip of the core is further received by the bore of the bushing arranged adjacent to the dorsal end of the cavity.

injecting molten plastic material into the molding cavity to form the tubular plastic part.

opening the injection mold after the plastic material is sufficiently cured and removing the tubular plastic part.

The described method may comprise in a preferred variation additionally the following steps:

clamping in the closed position of the injection mold the tip of the core in the bore of the bushing by displacing the piston in the axial direction towards the dorsal end of the cavity and thereby displacing the clamping segments inwardly in a radial direction via the conical second surface interacting with the conical first surface.

releasing in the closed position of the injection mold the tip of the core from the clamping in the bore by displacing the piston in the axial direction away from the dorsal end of the cavity.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described disclosure will be more fully understood from the detailed description given herein below and the accompanying drawings which should not be considered limiting to the disclosure described in the appended claims. The drawings are showing:

DETAILED DESCRIPTION OF THE INVENTION

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
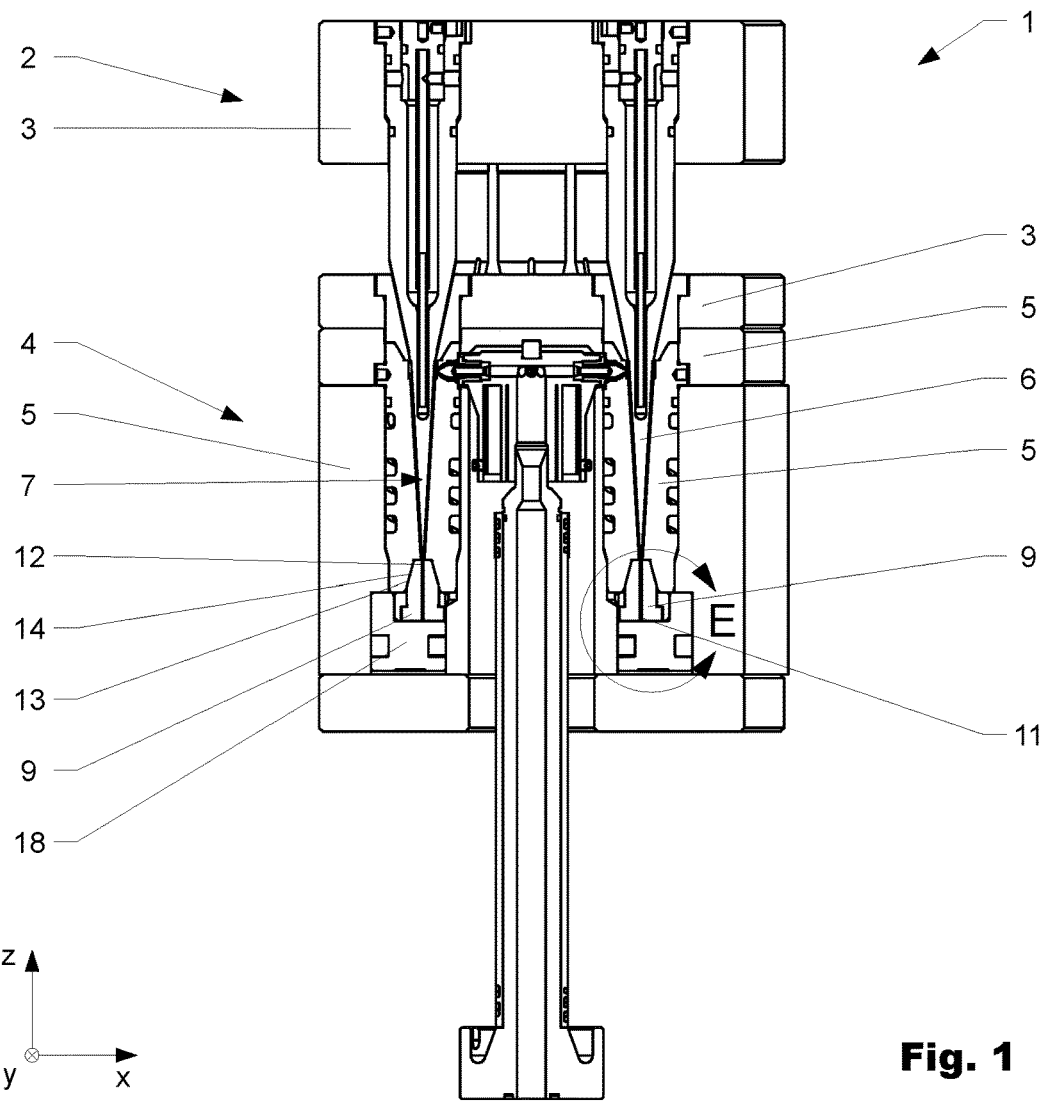
FIG. 1 shows a sectioned view of a first variation of an injection mold according to the disclosure.
Figure 2:
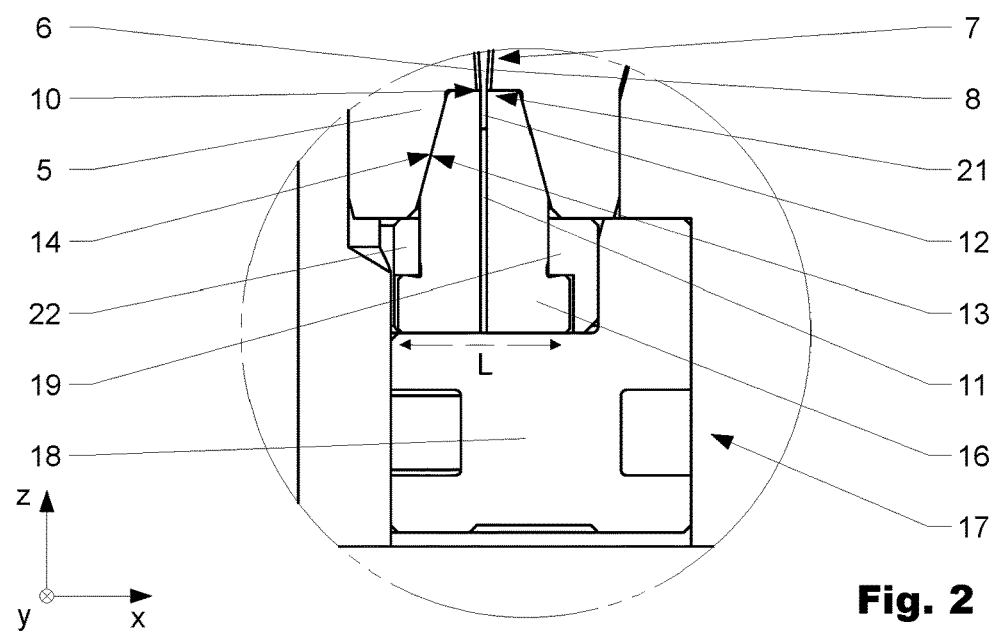
FIG. 2 shows a detailed view of the first variation shown in FIG. 1 indicated in FIG. 1 with the letter E.
Figure 3:
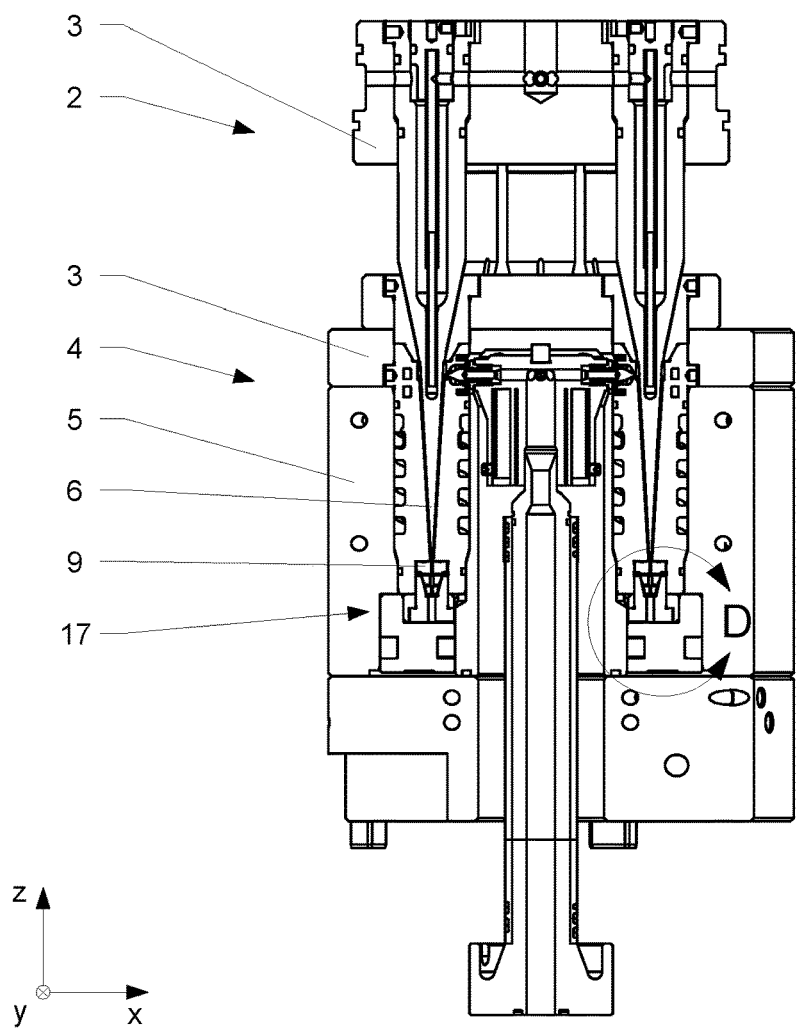
FIG. 3 shows a sectioned view of a second variation of an injection mold according to the disclosure.
Figure 4:
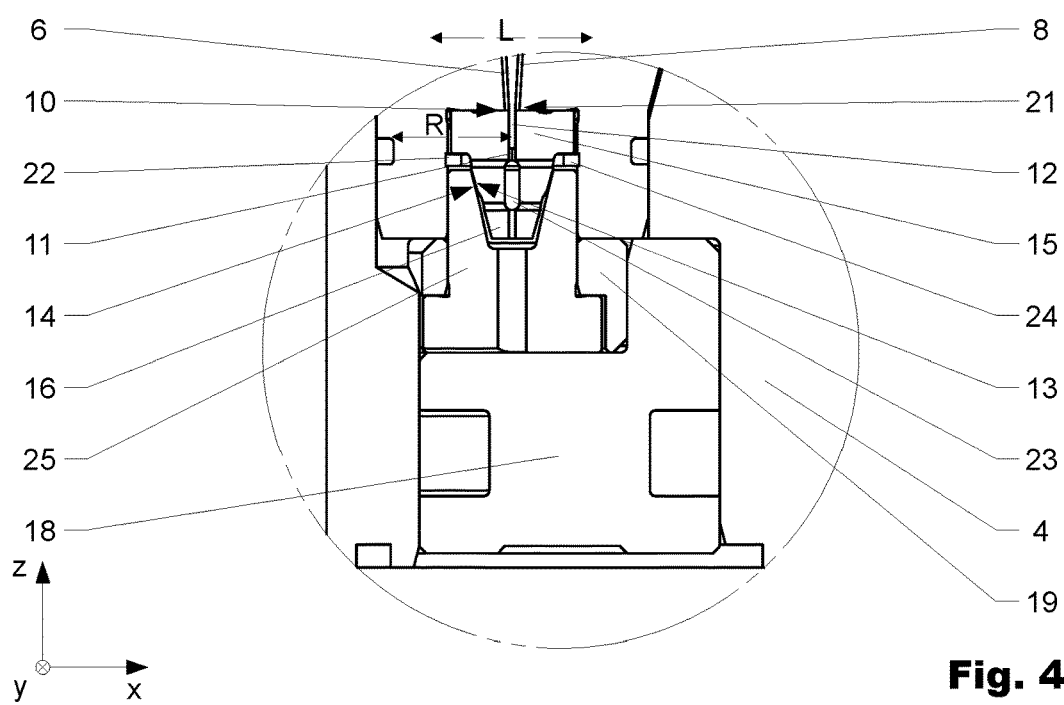
FIG. 4 shows a detailed view of the second variation shown in FIG. 3 indicated in FIG. 3 with the letter D.
Figure 5:
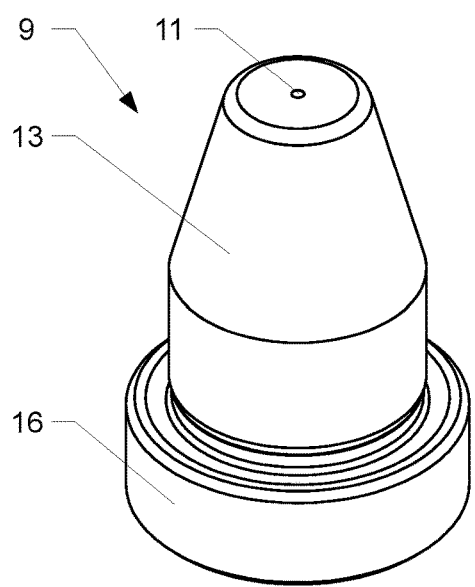
FIG. 5 shows a perspective view of the bushing of the first variation as shown in FIGS. 1 and 2.
Figure 6:
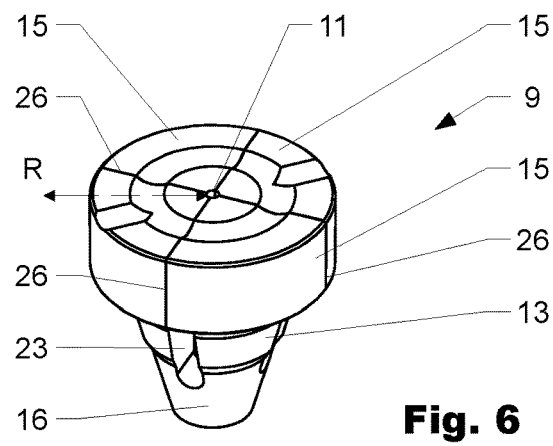
FIG. 6 shows a perspective view of the bushing of the second variation as shown in FIGS. 3 and 4.
Figure 7:
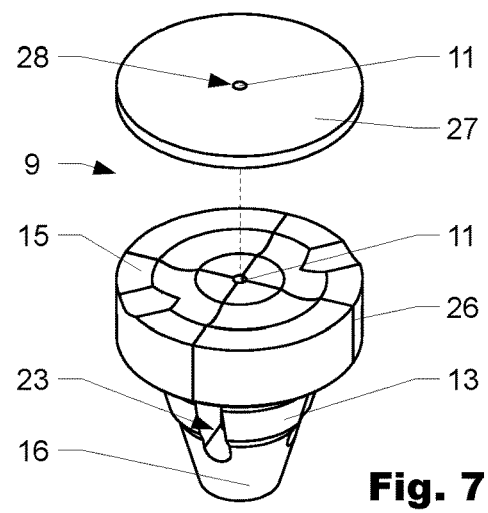
FIG. 7 shows a perspective view of the bushing of a third variation as shown in FIG. 8.
Figure 8:
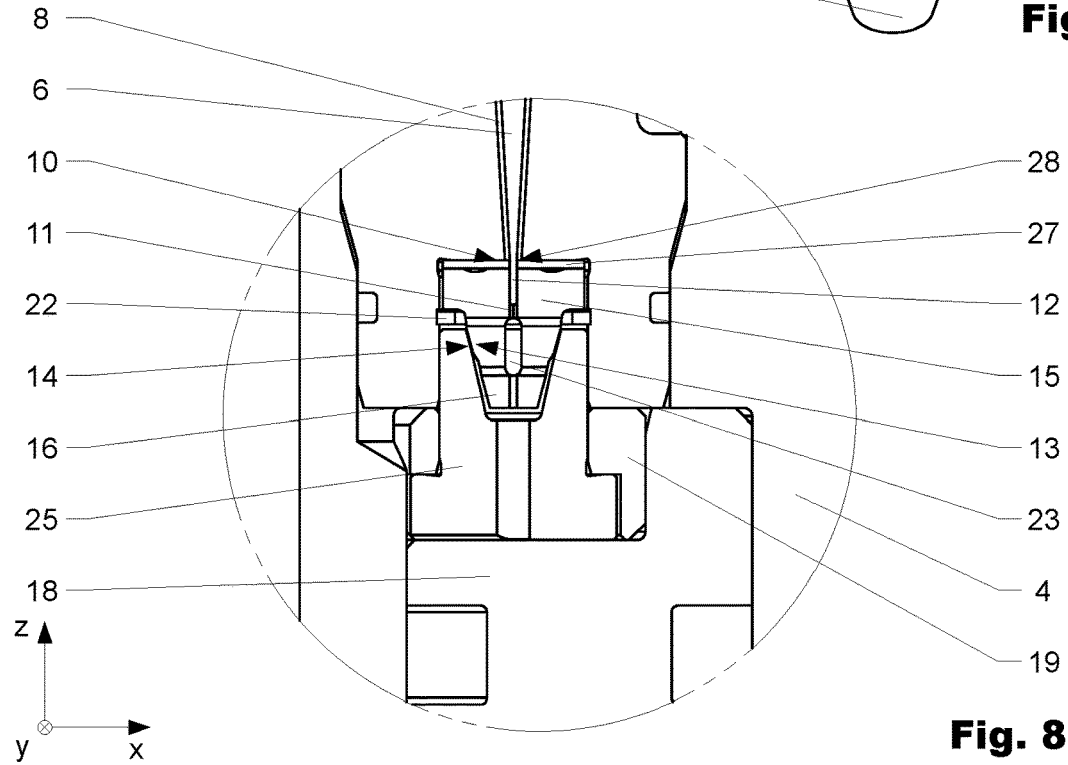
FIG. 8 shows a (partial) sectioned view of a third variation of an injection mold according to the disclosure

FIG. 1 shows a sectioned view of a first variation of an injection mold 1 according to the disclosure. FIG. 2 shows a detailed view of the first variation shown in FIG. 1 indicated in FIG. 1 with the letter E. FIG. 3 shows a sectioned view of a second variation of an injection mold 1 according to the disclosure and FIG. 4 shows a detailed view of the second variation shown in FIG. 3 indicated in FIG. 3 with the letter D. In FIG. 5 a perspective view of the bushing 9 of the first variation as shown in FIGS. 1 and 2 is displayed. FIG. 6 shows a perspective view of the bushing 9 of the second variation as shown in FIGS. 3 and 4. FIG. 8 shows a sectioned view of a third variation of an injection mold 1 according to the disclosure and FIG. 7 shows the bushing 9 of the third variation of FIG. 8 in a perspective and exploded view.

The variations of the injection mold 1 shown in FIGS. 1 and 3 are displayed in a closed position and comprise a first mold half 2 and a second mold half 4. To reach the closed position the two mold halves 2 and 4 are displaced towards each other in an axial direction z from an open position until they are in direct contact. The first mold 2 half comprises a first mold plate 3 and the second mold half 4 comprises a second mold plate 5. The Injection mold 1 further comprises at least one core 6 protruding from the first mold plate 3, in the variations shown several cores 6 protrudes from the first mold half 3. The second mold plate 5 comprises at least one cavity 7 to receive the core 6 of the first mold half 3 to form a molding cavity 8 in the closed position of the injection mold 1, as best visible in FIGS. 2, 4 and 8. A bushing 9 is arranged in the second mold half 4 adjacent to a dorsal end 10 of the cavity 7 at least partially displaceable with respect to the second mold plate 5. The bushing 9 comprises a bore 11 to receive a tip 12 of the core 6 in a closed position of the injection mold 1. As can be seen in FIGS. 2, 4 and 8 the bushing closes in combination with the tip 12 of the core 6 the molding cavity 8 at the dorsal end 10 of the cavity 7 in a molten plastic material tight manner.

FIGS. 2, 4 and 8 further show that the bushing 9 is arranged in lateral direction L in a floating manner. This is made possible by a holding means 22.

In order to center the bushing 9 with respect to the cavity 7 the bushing 9 comprises a conical first surface 13 arranged at the outside of the bushing 9 coaxially with respect to the bore 11. The first conical surface 13 interacts in the closed position of the injection mold 1 with a conical second surface 14 arranged at the second mold half 4 such that the tip 12 of the core 6 is centered with respect to the bore 11. In the first variation, visible in FIG. 2, the conical second surface 14 is formed as part of the second mold plate 5 and is arranged in the axial direction z stationary with respect to the cavity 7, between the cavity 7 and the bushing 9.

In the second variation visible in FIG. 4 the bushing 9 comprises in a circumferential direction several clamping segments 15 arranged displaceable in a radial direction R with respect to the bore 11, such that the tip 12 of the core 6 is in the closed position of the injection mold 1 accommodated and preferably clamped in the bore 11. The clamping segments 15 are mechanically interconnected to the conical first surface 13 on the outside of the bushing 9. This variation of the bushing 9 can best be seen in FIG. 6. In this case the bushing is held essentially stationary in the axial direction z with respect to the cavity 7 by a holding means 22 formed as a circlip 24. The clamping segments 15 are separated by several slits 26 in the bushing 9 extending at least partially in the axial direction z. In the shown variation, the clamping segments 15 are interconnected to each other by a common base 16. In addition, the bushing comprises several cut-outs 23 arranged laterally, each connecting the bore 11 and the outside of the bushing 9 respectively. The cut-outs 23 are each arranged between two clamping segments 15 and the common base 16. Each of the slits 26 discharge in the axial direction in the respective cut-out 23.

The third variation, as visible in FIG. 8, differs from the second variation, in that the bushing 9 comprises a dedicated front segment 27, here formed as a separate part. In the shown third variation the front segment 27 is formed as a washer-type part, as best visible in FIG. 7. During operation, the front segment 27 is arranged between the dorsal end 10 of the cavity 7 and the several clamping segments 15, extending essentially perpendicular to the axial direction Z. The bore 11 is partially arranged in the front segment 27 comprising an undisrupted inlet opening 28 of the bore 11 for receiving the core 6 in a low-friction manner. As can be seen in FIG. 8, in the closed position, the core 6 is received in the bore 11, the core extending via the inlet opening 28 through the front section 27, such that the tip 12 of the core 6 is in the closed position of the injection mold 1 accommodated and preferably clamped in the bore 11, in particular by the clamping segments 15.

As best visible in FIGS. 2, 4 and 8 the bushing 9 is in the closed position of the injection mold 1 displaceable and clampable with respect to the second mold plate 5 by an actuator 17 arranged displaceable with respect to the second mold plate 5. The bushing 9 is therefore arranged in the axial direction Z between the dorsal end 10 of the cavity 7 and the actuator 17. The actuator 17 comprises a ring shaped pneumatic piston 18, which is displaceable in the axial direction z to induce a relative force between the conical first surface 13 and the conical second surface 14. In the first variation, shown in FIG. 2, this leads an alignment between the bushing 9 and the cavity 7, and therefore an alignment between the core 6 and the cavity 7, as the core 6 with its tip 12 in the bore 11 of the bushing 9 is guided into this alignment by the bushing 9. In the second and third variation, as shown in FIGS. 4 and 8, the actuator comprises a pusher insert 25 and an alignment is achieved an analogous way. Here, the conical second surface 14 is formed as part of the actuator 17, in particular as part of the pusher insert 25 and is in the axial direction z displaceable with respect to the cavity 7. The actuator 17 further comprises a spring loaded actuation plate 19, which is configured to exert a restoring force in the axial direction z. The actuation plate 19 is in the shown variation ring shaped similar to shape of the piston 18 and further comprises through bores to partially accommodate the pusher inserts 25.

To monitor the manufacturing of the tubular plastic parts at least one sensor 21 is arranged in or adjacent to the bushing 9.

Rather, the words used in the specification are words of description rather than limitation, and it is understood that various changes may be made without departing from the scope of the disclosure.

The invention claimed is:

1. An injection mold for the manufacturing of at least one tubular plastic part, comprising:
   a. first mold half comprising a first mold plate and a second mold half comprising a second mold plate arranged displaceable with respect to each other in an axial direction (Z) between an open position and a closed position; and
   b. at least one core protruding from the first mold plate; and
   c. the second mold plate comprising at least one cavity suitable to receive the core of the first mold half to form a molding cavity in the closed position of the injection mold for receiving molten plastic material therein to form the tubular plastic part;
   d. a bushing arranged in the second mold half adjacent to a dorsal end of the cavity at least partially displaceable with respect to the second mold plate, said bushing comprising a bore in a closed position of the injection mold suitable to receive a tip of the core;
   wherein the bushing comprises a conical first surface arranged at the outside of the bushing coaxially with respect to the bore interacting in the closed position of the infection mold with a conical second surface arranged at the second mold half such that the tip of the core is centered with respect to the bore.

2. The injection mold according to claim 1, wherein the bushing is at least partially arranged in a lateral direction (L) in a floating manner.

3. The injection mold according to claim 1, wherein the bushing is at least partially arranged in the axial direction (Z) in a displaceable manner.

4. The injection mold according to claim 1, wherein the bushing comprises in a circumferential direction several clamping segments arranged displaceable with respect to each other in a radial direction with respect to the bore such that the tip of the core in the closed position of the injection mold is clamped in the bore.

5. The injection mold according to claim 4, wherein the clamping segments are interconnected to each other by a common base.

6. The injection mold according to claim 4, wherein the bushing comprises a front segment being arranged during operation between the dorsal end of the cavity and the clamping segments, the front segment comprising an undisrupted inlet opening of the bore for receiving the tip of the core.

7. The injection mold according to claim 1, wherein the bushing is in the closed position of the injection mold at least partially displaceable and/or clampable with respect to the second mold plate by an actuator arranged at least partially displaceable with respect to the second mold plate.

8. The injection mold according to claim 7, wherein the actuator comprises at least one displaceable hydraulic piston and/or a pneumatic piston.

9. The injection mold according to claim 8, wherein the piston is ring shaped.

10. The injection mold according to claim 7, wherein the actuator comprises a spring loaded actuation plate.

11. The injection mold according to claim 10, wherein the actuator comprises a rod-shaped pusher mechanically interconnecting the first mold half and the spring loaded actuation plate in the closed position, such that actuation plate is displaceable with respect to the second mold plate by the rod-shaped pusher.

12. The injection mold according to claim 1, wherein at least one sensor is arranged in or adjacent to the bushing.

13. The injection mold according to claim 1, wherein the bushing is held with respect to the second mold plate or the actuator by a holder.

14. The injection mold according to claim 1, wherein the bushing comprises at least one cut-out arranged laterally and connecting the bore and the outside of the bushing.

15. A method for manufacturing at least one tubular plastic part with an injection mold according to claim 1, said method comprising the following steps:
   a. closing the injection mold by displacing the mold halves relative to each other from the open position into the closed position, wherein
      i. the core of the first mold plate is received in the cavity of the second mold plate and the tip of the core projects in the axial direction (Z) from the dorsal end of the cavity, and
      ii. said tip of the core is received by the bore of the bushing arranged adjacent to the dorsal end of the cavity;
   b. injecting molten plastic material into the molding cavity to form the tubular plastic part;
   c. opening the injection mold after the plastic material is cured and removing the tubular plastic part.

16. The method according to claim 15 further comprising the following steps:
   a. clamping in the closed position of the injection mold the tip of the core in the bore of the bushing by displacing the piston in the axial direction (Z) towards the dorsal end the cavity and thereby displacing the clamping segments inwardly in a radial direction (r) via the conical second surface interacting with the conical first surface; and
   b. releasing in the closed position of the injection mold the tip of the core from the clamping in the bore by displacing the piston in the axial direction (Z) away from the dorsal end the cavity.

* * * * *